Figure 1:
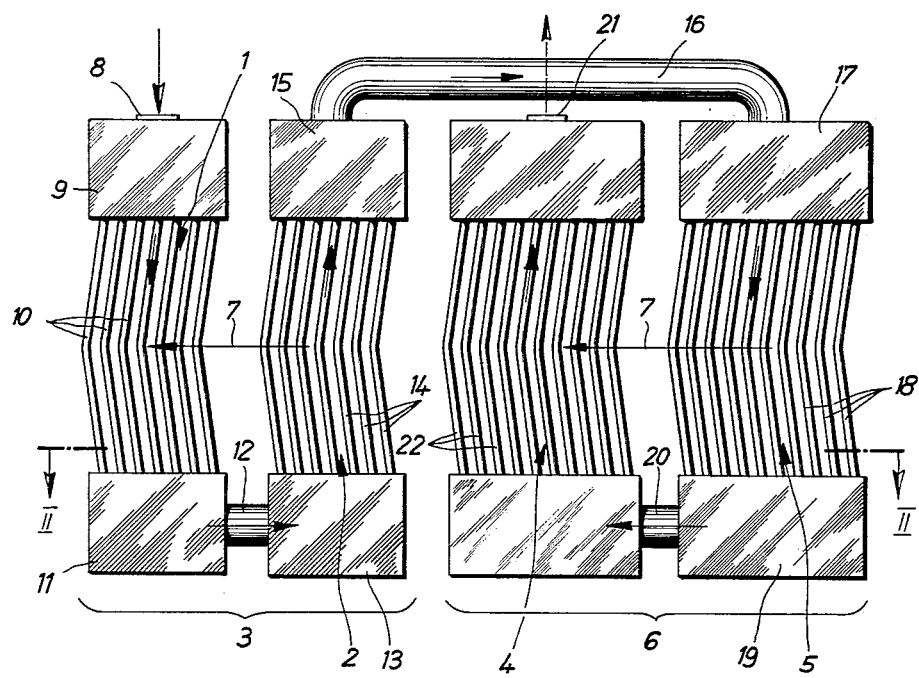

May 26, 1964  F. HEYN  3,134,430

METALLIC RECUPERATOR FOR HIGH WASTE GAS TEMPERATURES

Filed Nov. 28, 1960

INVENTOR.

Friedbert Heyn

BY

United States Patent Office 3,134,430
Patented May 26, 1964

3,134,430
METALLIC RECUPERATOR FOR HIGH WASTE
GAS TEMPERATURES
Friedbert Heyn, Krefeld, Germany, assignor to Industrie-Companie Kleinewefers Konstruktions- und Handels-gesellschaft m.b.H., Krefeld, Germany
Filed Nov. 28, 1960, Ser. No. 72,051
Claims priority, application Germany Mar. 21, 1960
4 Claims. (Cl. 165—145)

The present invention relates to a metallic recuperator for use in connection with the employment of high waste gas temperatures.

A metallic recuperator in contrast to recuperators of stoneware has with regard to its applicability certain limits in thermal and mechanical respect in view of the metallic material. In order not to exceed these limits while on the other hand assuring a high degree of efficiency of a metallic recuperator, it has been the practice heretofore to admix cold air or cooler waste gases to the hot waste gases whereby it is possible to lower the overall temperature of the waste gas to such an extent that said temperature will just be below the limits permissible for the high heat resistant material of the recuperator.

However, aside from the fact that the admixture of cool air or cooler waste gases results in a heat loss and thereby in a reduction of the effective temperature drop, it is also necessary to take into consideration the size of the recuperator inasmuch as the same flow resistance is encountered when operating such recuperator with admixed cooled waste gas as is the case when operating the recuperator without such admixture.

Furthermore, the admixture of cool air or cooler waste gases can never be so uniform that temperature "streaks" or layers of different temperatures can be avoided of which the hotter layers may easily effect a local overheating of the metallic recuperator. In order to overcome this drawback, it is necessary to control the quantity of cold air in such a way as to make sure that the maximum admissible waste gas temperature will not be exceeded.

For purposes of heating up a gaseous medium in steel recuperators, an apparatus has been developed the hot end of which is exposed to the danger of an overheating by the oncoming heating gas and by the heat emanated or radiated from the masonry of the heating gas feeding passage. With this apparatus, an easily exchangeable auxiliary recuperator is arranged ahead of the endangered end of the steel recuperator when looking in the direction of flow of the heating gases. This auxiliary recuperator is arranged parallel to the main recuperator and mounted within the flow of the gas to be heated. The medium to be heated in the auxiliary recuperator is guided in cross counter flow. However, experience has shown that neither the parallel arrangement of the auxiliary recuperator with the main recuperator nor the guiding of the medium to be heated in the auxiliary recuperator will be able satisfactorily to solve the problem of avoiding overheating.

There has furthermore been suggested a metallic recuperator for high pre-heating temperatures while avoiding means of obtaining an increased surface-heat-transfer coefficient. In conformity with this metallic recuperator, the reduction in the surface-heat-transfer coefficient at the gas side is to be effected primarily by maintaining the speed of the gas flow at the hotter area at a lower value whereas the surface-heat-transfer coefficient at the cooler air side is increased by increasing the speed which may be done by decreasing the flow cross section.

However, also this arrangement does not represent a satisfactory solution inasmuch as it is too complicated.

It is, therefore, an object of the present invention to provide a metallic recuperator which will overcome the above mentioned drawbacks.

It is another object of this invention to provide a metallic recuperator which will assure that a local overheating of the metallic parts of the recuperator will be safely avoided without the necessity of admixing cold air or cool waste gases.

It is still another object of this invention to provide a metallic recuperator as set forth in the preceding paragraphs, which will be characterized by a high thermal efficiency that will almost reach the limit of the thermal stress of the metal of the recuperator.

These and other objects and advantages of the invention will appear more clearly from the following specification in connection with the accompanying drawing in which:

FIG. 1 diagrammatically illustrates a side view of a recuperator according to the present invention.

Figure 2:
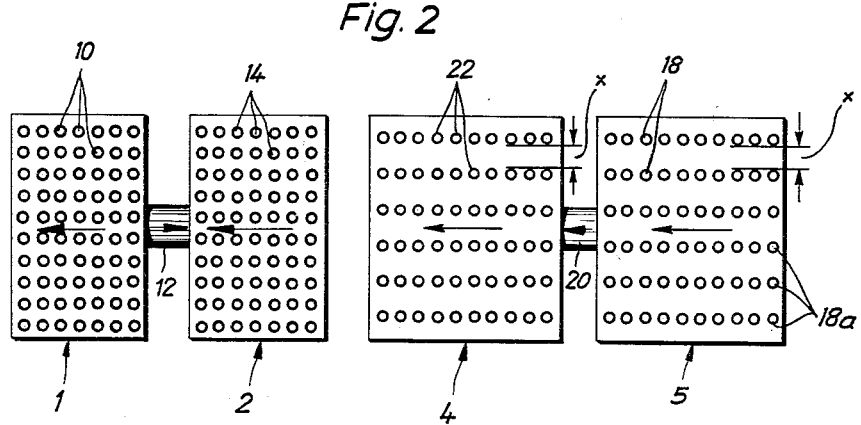

FIG. 2 is a section taken along the line II—II of FIG. 1.

The present invention is based on a metallic recuperator for high waste gas temperatures with a main group of pipes and an auxiliary group of pipes which precede said main group, i.e. are located ahead thereof when looking from the discharge side. It has been found according to the present invention that the objects outlined above can best be realized when the distance of the pipes of the auxiliary group in a direction perpendicular to the direction of flow of the waste gases amounts to three times the pipe diameter and when the medium (such as air, or air blast) pre-heated in the main group is passed in cross steady flow (Kreuzgleichstrom) in the auxiliary group. The distance between the pipes in a direction perpendicular to the direction of flow of the flue gases brings about such flue gas speed that the formation of entrance turbulance at the pipes at the end face of the auxiliary group will be avoided for all practical purposes, whereas all other pipes which are located in the flow direction behind said first pipes, i.e. all pipes within the auxiliary group, will be acted upon nearly uniformly. In this way the load on the heating surfaces of all pipes within the auxiliary group will be substantially uniform.

In order to make sure that the first pipes acted upon and pertaining to the auxiliary group will not be overheated, the medium to be heated will after a pre-heating in the main group be passed in cross continuous flow into the auxiliary group. As a result thereof, first that part of the medium to be heated which has the lower temperature will flow through the pipes at the end face of the auxiliary group. Thus, while an overheating of the pipes within the auxiliary group is prevented by a uniform action of the medium upon the pipes, those pipes at the end face of the auxiliary group will be protected against overheating by the special way of conducting the medium to be heated.

According to a practical embodiment, the number of the pipes in the auxiliary group may at greater distance perpendicular to the direction of flow of the waste gases correspond approximately to the number of pipes of the main group. However, if desired the number of the pipes in the auxiliary group may be less than the number of pipes in the main group whereby an increase in the flow velocity of the medium to be heated will be effected in the auxiliary group as a result of which the surface-heat-transfer coefficient will be increased.

Referring now to the drawing in detail, the recuperator illustrated therein comprises a main group 3 of pipes which comprise the sections 1 and 2. The said recuperator furthermore comprises the preceding or auxiliary group 6 composed of the sections 4 and 5. The direction of flow of the waste gas is indicated by the arrows 7. The medium to be heated enters the section 1 of the main group at the connection 8 and after being distributed in the container 9 passes through pipes 10 into the lower box 11. From here the medium to be heated pasess through the connection 12 in a direction counter to the direction of flow of the waste gases into the lower box 13 of section 2 and from there again in cross flow through pipes 14 to the upper container 15.

Container 15 communicates through conduit 16 with an upper container 17 of section 5 of the auxiliary group. After the medium to be heated has passed the pipes 18 into the lower box 19 and from there through connection 20, the medium to be heated passes into the section 4 and from there flows to the discharge connection 21 where it leaves the recuperator.

As will be evident from FIG. 2, the pipes 18 of the section 5 are spaced from each other by a distance $x$ in the direction perpendicular to the direction of flow 7 of the waste gases. Similarly, also the pipes 22 of the section 4 of the auxiliary group 6 are spaced from each other in the same direction by a distance $x$. The said distance $x$ amounts to three times the diameter of the pipes 18 and 22 respectively. The distance of the pipes 10 and 14 in the direction perpendicular to the direction of flow of the waste gases may amount to from 1 to 1½ the diameter of the pipes. In FIG. 2 of the drawing, the horizontal distances of the pipes from each other are shown larger for more clearly indicating the above mentioned difference.

In view of the distance of the pipes 18 from each other and also of the pipes 22 from each other in a direction perpendicular to the direction of flow of the waste gases, such a speed of the waste gases will be obtained that the formation of entrance turbulence at the end face 18a of the first row of pipes 18 (with regard to the oncoming flue gases), will be prevented and that the pipes located in the direction of flow of the waste gases behind said first row of pipes, will almost uniformly be acted upon by the waste gases.

An overheating, especially of the pipes 18 in the direction of flow will be prevented for all practical purposes due to the fact that the medium to be heated is first passed through pipe 16 from the main group into the section 5 which is located ahead of the section 4 when looking in the direction of flow, in which section 4 the hottest part of the medium to be heated will be located.

It is, of course, to be understood that the present invention is, by no means, limited to the particular construction shown in the drawing but also comprises any modifications within the scope of the appended claims.

What I claim is:

1. In a metallic recuperator, in which waste gas of high temperature is passed between the pipes of a pipe system through the pipes of which a medium to be heated up is to be conveyed: a first pipe group having an inlet for the entrance of the medium to be heated in the pipes of said group and having an outlet for discharging the medium heated in said first pipe group, the longitudinal extension of the pipes of said first group being such as to permit flue gases to be brought into heat exchange therewith to contact said pipes while passing in a direction transverse to the longitudinal extension of said pipes, and a second pipe group preceding said first pipe group when looking in the direction of flow of waste gas to be brought into heat exchange with said first group, said second group having an inlet, conduit means establishing direct communication of said outlet of said first pipe group with said inlet of said second group, said second pipe group also having a discharge opening for discharging the medium received by and heated in said second pipe group to a place of consumption, the pipes of said second pipe group likewise being located in the path of said waste gas and having their longitudinal extension in the same direction as the longitudinal extension of the pipes of said first pipe group, the distance between adjacent pipes of said second pipe group perpendicular to the direction from said second pipe group to said first pipe group and transverse to the longitudinal direction of the pipes of said second pipe group being considerably greater than the distance between adjacent pipes of said first pipe group in a direction perpendicular to the direction from said second pipe group to said first pipe group and transverse to the longitudinal direction of the pipes of said first pipe group.

2. A metallic recuperator according to claim 1, in which the said distance between adjacent pipes of said second pipe group is approximately three times the diameter of the pipes of said second pipe group.

3. A metallic recuperator according to claim 1, in which the number of the pipes of the second group approximately equals the number of the pipes of said first group.

4. In a metallic recuperator in which waste gases of high temperatures are passed between the pipes of a pipe system through the pipes of which a medium to be heated up is to be conveyed: a first pipe group comprising a first unit of pipes with a first inlet and a first outlet for the intake and the discharge respectively of a medium to be heated up in said first unit, said first group also including a second unit of pipes comprising a second inlet communicating with said first outlet and also comprising a second outlet, the pipes of said first and second units being in serial communication with each other and extending substantially in a direction transverse to the direction when looking from said first unit to said second unit so as to permit flue gases flowing in the direction from said second unit to said first unit to flow around and come into heat exchange with the pipes of said first and second units, a second pipe group comprising a third unit of pipes with a third inlet serially communicating with said second outlet and also comprising a third outlet, said second group of pipes furthermore including a fourth unit of pipes with a fourth inlet serially communicating with said third outlet, said fourth unit of pipes also comprising a fourth outlet for discharging the medium to be heated from said fourth unit of pipes to a place of consumption, the pipes of said third and fourth unit of pipes having their longitudinal extension substantially in the same direction as the longitudinal extension of the pipes of said first and second units to thereby permit flue gases flowing in the direction from said fourth unit to said third unit to flow around and come into heat exchange with the pipes of said second group of pipes, the distance between the pipes of said third and fourth units of pipes in the direction transverse to the direction from said third unit to said fourth unit being considerably greater than the distance between the pipes of said first and second units of pipes in a direction transverse to the direction from said second unit to said first unit, the arrangement being such that when looking in the direction from said third unit to said first unit, the fourth unit of pipes is located behind the third unit of pipes and precedes said second unit of pipes while said second unit of pipes precedes said first unit of pipes, whereby the medium to be heated first passes from the first unit of pipes through the second unit of pipes in a flow counter to the flow of flue gases to be passed from and around the pipes of said third unit to and around the pipes of said first unit, whereupon the medium to be heated then passes from said second unit of pipes to said third unit of pipes and from the latter in the same direction as the said flow of flue gases from said third unit of pipes to said fourth unit of pipes.

References Cited in the file of this patent
UNITED STATES PATENTS

| | | |
|---|---|---|
| 2,947,522 | Keller | Aug. 2, 1960 |
| 3,007,681 | Keller | Nov. 7, 1961 |